United States Patent
Wang

(10) Patent No.: US 10,484,340 B2
(45) Date of Patent: Nov. 19, 2019

(54) DATA ENCRYPTION SYSTEM BY USING A SECURITY KEY

(71) Applicant: LEADOT INNOVATION, INC., Kaohsiung (TW)

(72) Inventor: Justin Wang, Taipei (TW)

(73) Assignee: LEADOT INNOVATION, INC., Kaohsiung (TW)

( * ) Notice: Subject to any disclaimer, the term of this patent is extended or adjusted under 35 U.S.C. 154(b) by 139 days.

(21) Appl. No.: 15/296,050

(22) Filed: Oct. 18, 2016

(65) Prior Publication Data

US 2017/0126632 A1   May 4, 2017

(30) Foreign Application Priority Data

Nov. 3, 2015   (TW) .............................. 104136096 A

(51) Int. Cl.
| | |
|---|---|
| *H04L 29/06* | (2006.01) |
| *H04L 29/08* | (2006.01) |
| *G06F 21/60* | (2013.01) |
| *H04W 12/02* | (2009.01) |
| *H04L 9/06* | (2006.01) |

(52) U.S. Cl.
CPC ........ *H04L 63/0428* (2013.01); *G06F 21/602* (2013.01); *H04L 9/0618* (2013.01); *H04L 67/04* (2013.01); *H04L 67/10* (2013.01); *H04L 67/1097* (2013.01); *H04L 67/125* (2013.01); *H04W 12/02* (2013.01)

(58) Field of Classification Search
CPC ............... H04L 63/0428; H04L 9/0618; H04L 67/1097; G06F 21/602; H04W 12/02
See application file for complete search history.

(56) References Cited

U.S. PATENT DOCUMENTS

| | | | | |
|---|---|---|---|---|
| 5,757,922 | A  * | 5/1998 | Shiroshita | ............... H04L 12/22 380/37 |
| 8,799,053 | B1 * | 8/2014 | Goldberg | ............ G06F 21/6254 705/7.29 |
| 9,705,854 | B2 * | 7/2017 | Khazan | .................. G06F 21/602 |
| 9,866,591 | B1 * | 1/2018 | Statica | .................... H04L 63/20 |
| 2003/0149881 | A1 * | 8/2003 | Patel | ........................ H04L 9/32 713/186 |
| 2003/0174835 | A1 * | 9/2003 | Yokota | .................. H04L 9/0618 380/28 |

(Continued)

FOREIGN PATENT DOCUMENTS

| | | |
|---|---|---|
| CN | 1264865 A | 8/2000 |
| CN | 101919202 A | 12/2010 |

(Continued)

*Primary Examiner* — Sher A Khan

(74) *Attorney, Agent, or Firm* — Winston Hsu

(57) ABSTRACT

Data encryption system includes a data generation device, a security key mapping device, an internet transmission security device, and a receiver. The data generation device is used for generating raw data. The security key mapping device is linked to the data generation device for encrypting the raw data to generate a plurality of encrypted data blocks according to a security key. The internet transmission security device is linked to the security key mapping device for transmitting and protecting the plurality of encrypted data blocks. The receiver is linked to the internet transmission security device for receiving the plurality of encrypted data blocks.

6 Claims, 2 Drawing Sheets

(56) References Cited

U.S. PATENT DOCUMENTS

| | | | |
|---|---|---|---|
| 2005/0081045 A1* | 4/2005 | Nicodemus | H04L 9/3271 713/182 |
| 2005/0135617 A1* | 6/2005 | Cho | H04N 7/1675 380/210 |
| 2005/0229009 A1* | 10/2005 | Fujii | H04L 9/08 713/186 |
| 2007/0033421 A1* | 2/2007 | Morita | H04L 63/0428 713/193 |
| 2008/0256359 A1* | 10/2008 | Kahn | H04H 60/14 713/170 |
| 2009/0161647 A1* | 6/2009 | Mestechkin | H04B 1/707 370/342 |
| 2009/0307495 A1* | 12/2009 | Matsuo | H04L 9/002 713/171 |
| 2010/0199042 A1* | 8/2010 | Bates | G06F 11/2064 711/114 |
| 2011/0202755 A1* | 8/2011 | Orsini | H04L 63/029 713/151 |
| 2012/0033803 A1* | 2/2012 | Huang | H04L 9/001 380/28 |
| 2013/0036312 A1* | 2/2013 | Anquet | G06F 21/78 713/189 |
| 2013/0163754 A1 | 6/2013 | Ogawa | |
| 2014/0082376 A1 | 3/2014 | Roden | |
| 2014/0115328 A1* | 4/2014 | Allen | H04L 29/06 713/165 |
| 2014/0129836 A1* | 5/2014 | Ogawa | G06F 21/10 713/168 |
| 2014/0250500 A1* | 9/2014 | Lee | G06F 21/32 726/4 |
| 2014/0258731 A1* | 9/2014 | Chia | G06F 21/602 713/189 |
| 2015/0081562 A1* | 3/2015 | Roullier | H04L 9/0894 705/50 |
| 2015/0156174 A1* | 6/2015 | Fahey | H04L 63/0428 713/168 |
| 2015/0205731 A1* | 7/2015 | Dell | G06F 21/602 713/193 |
| 2015/0271203 A1 | 9/2015 | Duminuco | |
| 2015/0379276 A1* | 12/2015 | Glickman | G06F 21/602 713/193 |
| 2016/0322990 A1* | 11/2016 | Tuers | G06F 11/1068 |
| 2017/0237715 A1* | 8/2017 | Karkkainen | H04L 9/0662 713/153 |

FOREIGN PATENT DOCUMENTS

| | | |
|---|---|---|
| CN | 102347969 A | 2/2012 |
| CN | 103842985 A | 6/2014 |
| EP | 1 783 948 A1 | 5/2007 |
| EP | 2 391 968 A2 | 12/2011 |
| JP | 2007-4682 A | 1/2007 |
| JP | 2012-23618 A | 2/2012 |
| JP | 2015108807 A | 6/2015 |
| TW | 200500894 | 1/2005 |
| TW | 201445356 A | 12/2014 |
| TW | I497342 B | 8/2015 |
| WO | 0146808 A1 | 6/2001 |
| WO | 2009153846 A1 | 12/2009 |

\* cited by examiner

US 10,484,340 B2

DATA ENCRYPTION SYSTEM BY USING A SECURITY KEY

BACKGROUND OF THE INVENTION

1. Field of the Invention

The present invention illustrates a data encryption system, and more particularly, the data encryption system using a security key to encrypt data.

2. Description of the Prior Art

With the advancement of network techniques, various data information can be rapidly transmitted by using a wireless network. For example, image data can be transmitted from a user computer to a network. Then, a receiver (i.e., for example, a network node, another computer or a cloud server) linked to the network can receive the image data. Specifically, data transmission by using the network can achieve low error rate, high mobility convenience, and real-time communication.

Unfortunately, with the popularity of a network, the number of illegal hackers or data stealers increases year by year. To ensure a security of data transmission, when the data is transmitted to the network, various encryption methods are required. For example, when the data is transmitted by using a Wi-Fi protocol, a Wi-Fi protected setup (WPS) encryption method is popularly used for protecting data. Further, in the network layer protocol, secure socket layer (SSL) or transport layer security (TLS) is generally applied for providing advanced security reliability and transmitted packet integrity.

However, the illegal hackers or data stealers still have a chance to intrude into the above security mechanisms since the illegal hackers or data stealers can use superb skill or unlicensed device to crack the security mechanisms. In other words, when the illegal hackers or data stealers capture encrypted data, all useful data information can be extracted from the encrypted data (SSL or TLS data). Since the extracted data is regarded as non-encrypted data, information of the extracted data can be easily acquired by the illegal hackers or data stealers. In another case, when the data is transmitted within a user's computer (i.e., for example, data transmission between two hard disks) and the user's computer is unfortunately stolen by the data stealers, since the data is regarded as non-encrypted data, information of the data can be captured by the data stealers without any difficulty.

SUMMARY OF THE INVENTION

In an embodiment of the present invention, a data encryption system is disclosed. The data encryption system includes a data generation device, a security key mapping device, an internet transmission security device, and a receiver. The data generation device is used for generating raw data. The security key mapping device is linked to the data generation device for encrypting the raw data to generate a plurality of encrypted data blocks according to a security key. The internet transmission security device is linked to the security key mapping device for transmitting and protecting the plurality of encrypted data blocks. The receiver is linked to the internet transmission security device for receiving the plurality of encrypted data blocks.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
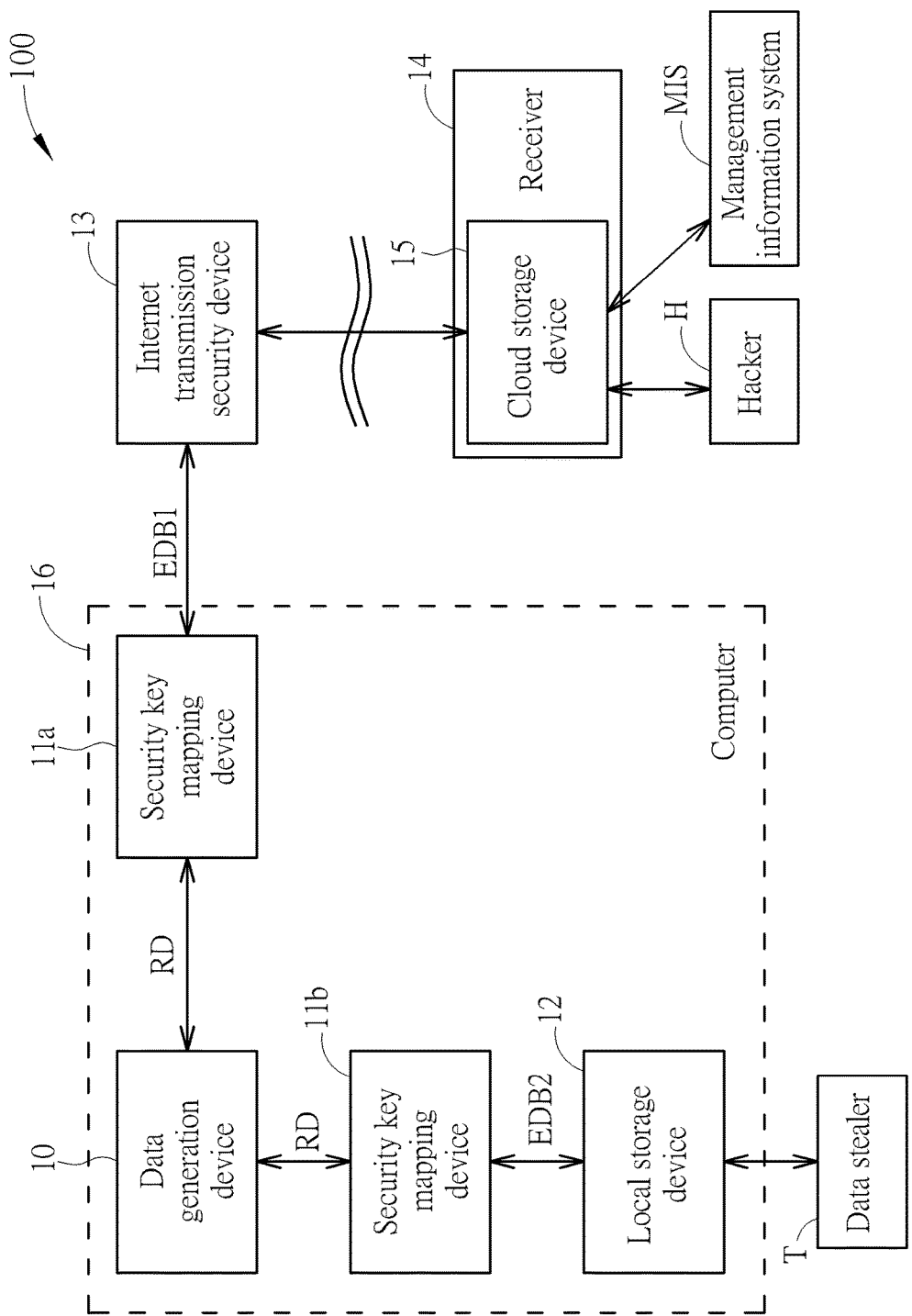
FIG. 1 is a block diagram of a data encryption system according to an embodiment of the present invention.

FIG. 1 is a block diagram of a data encryption system 100. As shown in FIG. 1, the data encryption system 100 includes a data generation device 10, a security key mapping device 11a, a security key mapping device 11b, an internet transmission security device 13, and a receiver 14. The data generation device 10 can be any device with capability of generating or displaying data. For example, the data generation device 10 can be a program or software installed in a computer 16. The data generation device 10 can also be an application program installed in a smart phone. In general, the data generation device 10 can be a virtual file system for generating raw data RD. After the data generation device 10 generates the raw data RD, the raw data RD is transmitted to the security key mapping device 11a. Here, the raw data RD can be a data stream, a network packet, or a data file. The security key mapping device 11a is linked to the data generation device 10. Specifically, the link in the embodiment denotes a connection status for data communication between two discrete components, such as a wireless link, a cable link, or an electrical link. After the security key mapping device 11a receives the raw data RD, the security key mapping device 11a encrypts the raw data RD according to a security key. Then, the raw data RD becomes a plurality of encrypted data blocks EDB1. In the embodiment, the security key can be a character sequence. The security key is authorized by an owner of the raw data RD. The security key can also be a password key defined by the owner of the raw data RD. A method of transformation from the raw data RD to the plurality of encrypted data blocks EDB1 by using the security key mapping device 11a is illustrated later. After the security key mapping device 11a generates the plurality of encrypted data blocks EDB1, the plurality of encrypted data blocks EDB1 are transmitted to the internet transmission security device 13. Specifically, the internet transmission security device 13 can be any device compatible network security protocol. For example, the internet transmission security device 13 can be a device for performing a Wireless Fidelity setup (WPS), a secure socket layer (SSL), or a transport layer security (TLS). Specifically, the internet transmission security device 13 can use an interleaver allocation mechanism to transmit and protect the plurality of encrypted data blocks EDB1. In other words, the internet transmission security device 13 is linked to the security key mapping device 11a for transmitting and protecting the plurality of encrypted data blocks EDB1. The receiver 14 can be linked to the internet transmission security device 13 through the network for receiving the plurality of encrypted data blocks EDB1. In the embodiment, the receiver 14 can be any typed receiver. The receiver 14 can be linked to a cloud storage device 15. However, all modifications of the receiver 14 and the cloud storage device 15 belong to a scope of the present invention. For example, the cloud storage device 15 can be a built-in device inside the receiver 14. The cloud storage device 15 is used for saving the plurality of encrypted data blocks EDB1. Further, two data transmission paths are considered in the data encryption system 100. The first data transmission path is illustrated above. Briefly, in the first data transmission path, the raw data RD is transmitted from the data generation device 10 to the security key mapping device 11a. The security key mapping device 11a encrypts the raw data RD and transmits the plurality of encrypted data blocks EDB1 to the internet transmission security device 13. Then, the receiver 14 receives the plurality of encrypted data blocks EDB1. Finally, the encrypted data blocks EDB1 are saved to the cloud storage device 15. For the first data transmission path, the cloud storage device 15 has a chance to be intruded on by an illegal hacker H or authorized by a management information system (MIS) for accessing data. When the data encryption system 100 uses the first data transmission path to transmit data, since the security key mapping device 11a can encrypt the raw data RD, a chance of useful data being extracted from the encrypted data blocks EDB1 by the illegal hacker H or MIS crackers can be reduced (i.e., The encrypted data blocks EDB1 are discrete and cannot be merged or decrypted with an arbitrary or unlicensed security key).

Further, in the data encryption system 100, a second data transmission path is also considered. Here, the data encryption system 100 can further include a security key mapping device 11b and a local storage device 12. As shown in FIG. 1, the security key mapping device 11b is linked to the data generation device 10. After the security key mapping device 11b receives the raw data RD, the security key mapping device 11b encrypts the raw data RD according to a security key. Then, the raw data RD becomes a plurality of encrypted data blocks EDB2. In the data encryption system 100, the security key mapping device 11b and the security key mapping device 11a can be two identical devices. The security key mapping device 11b and the security key mapping device 11a can be two devices with different encrypted algorithms. The local storage device 12 is linked to the security key mapping device 11b for saving the plurality of encrypted data blocks EDB2. Specifically, the local storage device 12 can be a memory, a hard disk, or a disk array of a computer 16. In the data encryption system 100, the data generation device 10, the security key mapping device 11a, the security key mapping device 11b, and the local storage device 12 can be integrated inside the computer 16. Thus, when the local storage device 12 (or the computer 16) is stolen, a data stealer T can easily capture (or say, download) the data in the local storage device 12. Fortunately, since the security key mapping device 11b is introduced to the data encryption system 100 for providing an advanced data encryption by using the security key, a chance of useful data being extracted from the encrypted data blocks EDB2 by the data stealer T can be reduced (i.e., The encrypted data blocks EDB2 are discrete and cannot be merged or decrypted with an arbitrary or unlicensed security key). Further, since the raw data RD is protected by using an encryption process of the key mapping device 11b, when the local storage device 12 or the computer 16 is recycled, a chance of useful data being extracted from the encrypted data blocks EDB2 by unscrupulous merchants can be also reduced. In the following, encrypted methods of the security key mapping device 11a and the security key mapping device 11b for protecting the raw data RD are illustrated.

Figure 2:
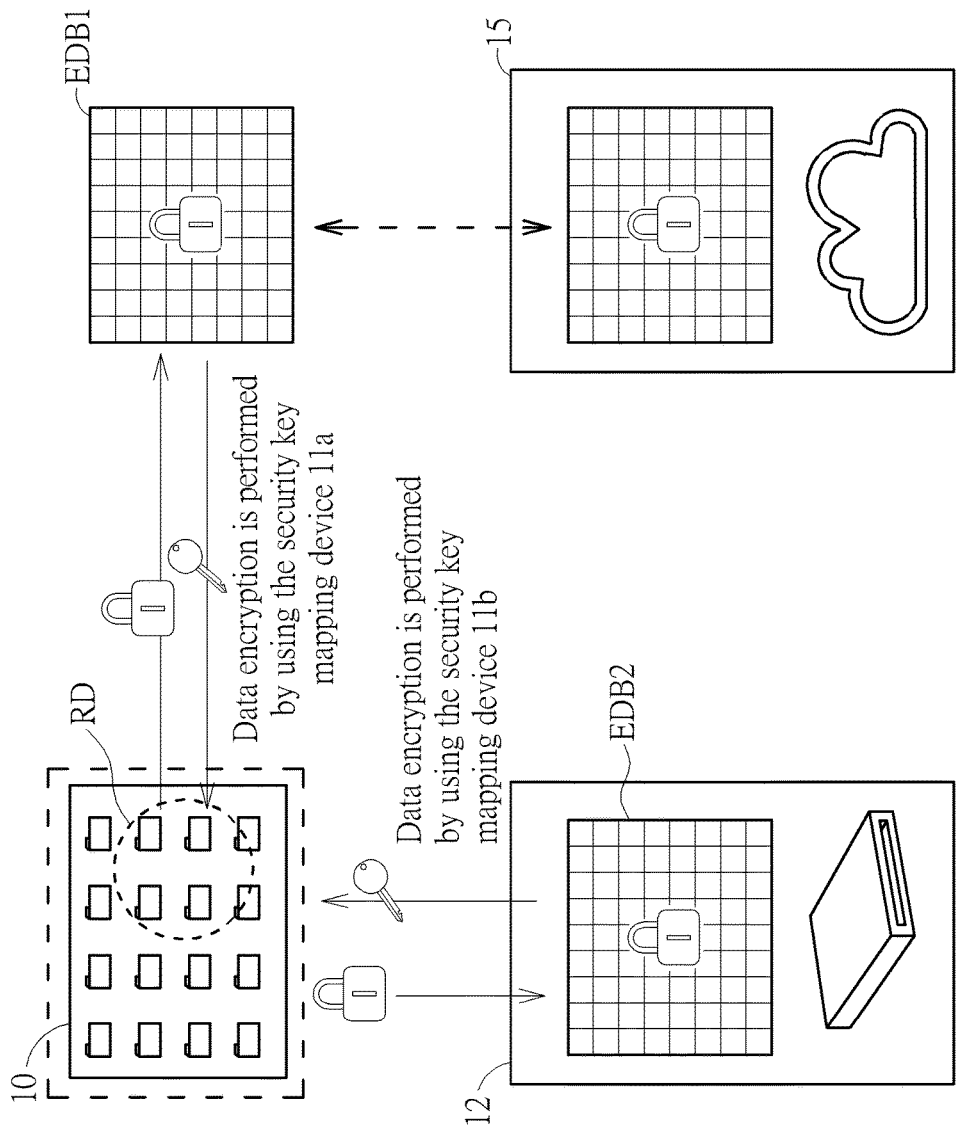
FIG. 2 is an illustration of data encryption by using security key mapping devices of the data encryption system in FIG. 1.

FIG. 2 is an illustration of data encryption by using security key mapping devices 11a and 11b of the data encryption system 100. As shown in FIG. 2, dual data transmission (or say, duplex data transmission) is considered in the data encryption system 100. For example, the data generation device 10 generates the raw data RD. The raw data RD is further encrypted to a plurality of encrypted data blocks EDB1 by using the security key mapping devices 11a. Such encrypted data blocks EDB1 are regarded as encrypted and scrambled data blocks. In other words, the raw data RD becomes several encrypted data fragments. Thus, the plurality of encrypted data blocks EDB1 cannot be cracked or analyzed without a security key. In other words, if (and only if) a data owner has the security key, the encrypted data blocks EDB1 can be restored to viewable data of the raw data RD. The encrypted methods of the security key mapping device 11a and the security key mapping device 11b are illustrated below. Here, since the security key mapping device 11a and the security key mapping device 11b can be two identical devices, the encrypted method with respect to the security key mapping device 11a is only illustrated here for presentation simplicity. After the data generation device 10 generates the raw data RD, the raw data RD is transmitted to the security key mapping device 11a. Then, a scale of the raw data RD (i.e., for example, a bit-based scale or a packet-based scale) is transformed to another scale of the raw data RD (i.e., for example, a block-based scale). For example, the raw data RD can be a portable document format (PDF) file with 200 k bytes. After the PDF file is transmitted to the security key mapping device 11a, the key mapping device 11a fragments the PDF file to several data blocks (i.e., for example, each data block with 10 k bytes). Then, the data blocks are scrambled by the key mapping device 11a. After the data blocks are scrambled, the key mapping device 11a encrypts each data block according to the security key. However, the data encryption system 100 can use arbitrary encrypted algorithm for encrypting each data block. For example, the security key can be a password key defined by a data owner. The security key mapping device 11a can use a polynomial coding algorithm to perform an encryption process in each data block according to the password key. Thus, the data blocks become the plurality of encrypted data blocks EDB1. Alternatively, the security key mapping device 11a can use a block coding algorithm to perform an encryption process in each data block according to the password key. Thus, after the plurality of encrypted data blocks EDB1 are received by the cloud storage device 15, the cloud storage device 15 (or peripheral devices) cannot identify contents of the plurality of encrypted data blocks EDB1. Further, the cloud storage device 15 (or peripheral devices) cannot identify synchronization correlation between the received plurality of encrypted data blocks EDB1 and a certain segment of the raw data RD. In other words, since the cloud storage device 15 cannot determine whether the plurality of encrypted data blocks EDB1 can be merged to an intact raw data RD without using a correct security key, the plurality of encrypted data blocks EDB1 are regarded as a partial file synchronized data of the raw data RD. In other words, after the raw data RD are transmitted to the security key mapping device 11a in form of a data stream, the security key mapping device 11a encrypts the raw data RD to the plurality of encrypted data blocks EDB1. When a hacker H or an MIS cracker captures several/partial encrypted data blocks EDB1, the hacker H or the MIS cracker cannot identify a category, a classification, or a file content of the raw data RD according to captured encrypted data blocks EDB1. Thus, since the raw data RD is protected by using an encryption process of the key mapping device 11a, a chance of useful data being extracted from the encrypted data blocks EDB1 by the hacker H or the MIS cracker can be reduced.

Similarly, in FIG. 2, the raw data RD is encrypted by using a key mapping device 11b. Then, a plurality of encrypted data blocks EDB2 is generated. In the following, the plurality of encrypted data blocks EDB2 are received and saved to a local storage device 12 (i.e., for example, hard disk). When the local storage device 12 is intruded or stolen by a data stealer T, the data stealer T can easily capture the data in the local storage device 12. However, the data stealer T cannot identify contents of captured data blocks since the captured data blocks are encrypted by a security key. Also, the data stealer T cannot identify synchronization correlation between the captured data blocks and the raw data RD. As a result, since the raw data RD is protected by using an encryption process of the key mapping device 11b, a chance of useful data being extracted from the encrypted data blocks EDB2 by the data stealer T can be reduced.

To sum up, a data encryption system for reducing a chance of data exfiltration is disclosed. The data encryption system uses a security key mapping device to encrypt raw data according to a predetermined security key. Then, the raw data is encrypted to generate a plurality of encrypted data blocks. Specifically, the plurality of encrypted data blocks is regarded as non-viewable data so that they cannot be easily identified without the security key. Thus, when illegal hackers or data stealers capture some data blocks, they cannot identify contents of captured data blocks and synchronization correlation between the captured data blocks and the raw data since the illegal hackers or data stealers have no security key. Thus, the data encryption system of the present invention can provide advanced security reliability and reduce the chance of data exfiltration.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data encryption system, comprising:
   a data generation device configured to generate raw data;
   a security key mapping device linked to the data generation device and configured to partition the raw data into a plurality of data blocks, scramble allocations of the plurality of data blocks, and then encrypt a plurality of data blocks with scrambled allocations to generate a plurality of encrypted data blocks according to a security key;
   an internet transmission security device linked to the security key mapping device and configured to transmit and protect the plurality of encrypted data blocks under a secure socket layer (SSL);
   a receiver linked to the internet transmission security device and configured to receive the plurality of encrypted data blocks;
   a memory linked to the security key mapping device and configured to save the plurality of encrypted data blocks;
   a cloud storage device linked to the receiver and configured to save the plurality of encrypted data blocks; and
   a management information system linked to the cloud storage device and configured to process data saved in the cloud storage device;
   wherein the security key comprises a character sequence authorized by a data owner of the raw data, the internet transmission security device performs an interleaver allocation process to the plurality of encrypted data blocks enhancing communication robustness by alternating allocations of different encrypted data blocks;
   wherein the data saved in the cloud storage device is accessed to transmission after the cloud storage device is authorized by the management information system, and the data generation device establishes a duplex data transmission link to the security key mapping device for performing duplex data transmissions, after the duplex data transmission link is established, the data generation device transmits a part of raw data to the security key mapping device and receives viewable data of another part of raw data restored from the plurality of encrypted data blocks through the duplex data transmission link when the data owner has the security key; and
   wherein the data generation device, the security mapping device, the internet transmission security device and the management information system are implemented in a computer as software.

2. The data encryption system of claim 1, further comprising:
   a local storage device linked to the security key mapping device and configured to save the plurality of encrypted data blocks.

3. The data encryption system of claim 1, wherein the plurality of encrypted data blocks belong to a plurality of scrambled data blocks.

4. The data encryption system of claim 1, wherein the security key mapping device uses a polynomial code to generate the plurality of encrypted data blocks according to the security key.

5. The data encryption system of claim 1, wherein the security key is a user password and the security key mapping device uses a block coding process to generate the plurality of encrypted data blocks according to the user password.

6. The data encryption system of claim 1, wherein the data generation device and the security key mapping device are allocated inside the computer and the receiver is allocated inside a cloud server.

* * * * *